(12) United States Patent
Vanapalli et al.

(10) Patent No.: US 11,308,971 B2
(45) Date of Patent: Apr. 19, 2022

(54) INTELLIGENT NOISE CANCELLATION SYSTEM FOR VIDEO CONFERENCE CALLS IN TELEPRESENCE ROOMS

(71) Applicant: Bank of America Corporation, Charlotte, NC (US)

(72) Inventors: Sandhya Vanapalli, Mumbai (IN); Santosh Govindram Bhardwaj, Hyderabad (IN); Jitu Nayak, Cuttack (IN); Satish Radheshyam Pandey, Benares (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 162 days.

(21) Appl. No.: 16/929,318

(22) Filed: Jul. 15, 2020

(65) Prior Publication Data

US 2022/0020386 A1 Jan. 20, 2022

(51) Int. Cl.
*G10L 21/0208* (2013.01)
*G10L 21/0272* (2013.01)
*G10L 21/14* (2013.01)
*G10K 11/178* (2006.01)
*H04R 1/10* (2006.01)
(Continued)

(52) U.S. Cl.
CPC ........ *G10L 21/0208* (2013.01); *G06N 3/0454* (2013.01); *G10K 11/17823* (2018.01);
(Continued)

(58) Field of Classification Search
CPC ..... G06F 16/248; G06F 40/30; G06N 3/0454; G06N 3/0481; G06N 3/084; G06N 3/08; G06V 20/41; G10K 11/17823; G10K 11/17873; G10K 2210/1081; G10K 2210/1082; G10K 2210/3038; G10K 2210/3045; G10L 15/02; G10L 15/20; G10L 15/26; G10L 17/18; G10L 19/0017;
(Continued)

(56) References Cited

U.S. PATENT DOCUMENTS 8,687,820 B2   4/2014  Truong et al.
9,154,730 B2  10/2015  Lee et al.
(Continued)

FOREIGN PATENT DOCUMENTS

WO   2012142975 A1   10/2012

*Primary Examiner* — Gerald Gauthier
(74) *Attorney, Agent, or Firm* — Moore & Van Allen PLLC; James C. Edwards

(57) ABSTRACT

An intelligent noise cancellation process for audio or video conference calls. Different levels of deep learning model classifiers are leveraged to determine, in real-time, the presence of noise data and voice data in audio input signals being received at numerous audio input devices. In response, appropriate action is taken to prevent the noise data from being included in the subsequent audio communication. Specifically, a lightweight neural network-based model classifier is initially used to identify noise data and/or the presence of predetermined trigger words or phrases in audio input signals. In the event that the lightweight model is unable to identify the presence of the triggering words/phrases, a heavyweight neural network-based model classifier is called upon, whereby the audio signals are attempted to be converted to a human-understandable language format (i.e., a text format) as a means of positively identifying voice data in audio input signals.

20 Claims, 4 Drawing Sheets

(51) Int. Cl.
*G06N 3/04* (2006.01)
*H04N 7/15* (2006.01)

(52) U.S. Cl.
CPC .......... *G10L 21/0272* (2013.01); *G10L 21/14* (2013.01); *H04N 7/15* (2013.01); *H04R 1/1083* (2013.01); *G10K 2210/1081* (2013.01); *H04R 2460/01* (2013.01)

(58) Field of Classification Search
CPC . G10L 21/0208; G10L 21/0272; G10L 21/14; H04M 9/082; H04N 7/15; H04R 1/1083; H04R 2460/01
USPC .......................................................... 381/94
See application file for complete search history.

(56) References Cited

U.S. PATENT DOCUMENTS

| | | | |
|---|---|---|---|
| 9,571,628 B1 | 2/2017 | Bostick et al. | |
| 10,210,860 B1 * | 2/2019 | Ward | G06N 3/084 |
| 11,030,207 B1 * | 6/2021 | Setlur | G06F 16/248 |
| 11,227,608 B2 * | 1/2022 | Kim | G10L 17/18 |
| 2006/0245379 A1 | 11/2006 | Abuan et al. | |
| 2017/0099458 A1 | 4/2017 | Johnson et al. | |
| 2018/0018990 A1 * | 1/2018 | Kim | G10L 19/0017 |
| 2020/0134449 A1 * | 4/2020 | Perez | G06N 3/084 |
| 2020/0251119 A1 * | 8/2020 | Yang | H04M 9/082 |
| 2020/0312343 A1 * | 10/2020 | Hsiung | G06N 3/0481 |
| 2020/0342291 A1 * | 10/2020 | Croxford | G06N 3/0454 |
| 2021/0216862 A1 * | 7/2021 | Liu | G06N 3/0454 |
| 2021/0233540 A1 * | 7/2021 | Kim | G06F 40/30 |
| 2021/0279511 A1 * | 9/2021 | Gordon | G06N 3/084 |
| 2021/0312915 A1 * | 10/2021 | Shaked | G10L 15/20 |
| 2021/0319796 A1 * | 10/2021 | Wang | G10L 15/02 |
| 2021/0383127 A1 * | 12/2021 | Kikin-Gil | G06V 20/41 |
| 2022/0020386 A1 * | 1/2022 | Vanapalli | G10L 21/0272 |
| 2022/0043854 A1 * | 2/2022 | Sawruk | G06N 3/08 |
| 2022/0045776 A1 * | 2/2022 | Choi | G10L 15/26 |

\* cited by examiner

INTELLIGENT NOISE CANCELLATION SYSTEM FOR VIDEO CONFERENCE CALLS IN TELEPRESENCE ROOMS

FIELD OF THE INVENTION

The present invention relates to audio communications, and more particularly, to intelligent apparatus, methods, computer program products and the like for intelligent cancellation of noise during audio and/or video conference calls, such as, calls performed in telepresence rooms.

BACKGROUND

The ability to implement noise cancellation systems during conventional telephone calls is well known. However, most of the existing systems for noise cancellation are not designed to work with multiple audio resources (i.e., multiple audio inputs/microphones), such as are present in a telepresence environment/room.

Specifically, in a telepresence environment each audio input device (i.e., microphone) is treated equally for receiving audio. As a result, the audio reception is not focused on the participants that are speaking and other noise inputs from other audio input devices are not filtered out prior to audio communication.

Additionally, in the telepresence environment each participant is tasked with repeatedly muting and unmuting their respective microphone in order to ensure that undesirable noise from the telepresence room is not part of the audio communication. Moreover, due in part to the repeated switching from mute state to unmute state and vice versa, a participant will often begin speaking and fail to realize that the microphone is in a mute state. In such situations, the other party to the communication is left to inform the participant of their oversight.

Therefore, a need exists to develop systems, methods, computer program products and the like that intelligently detect between which audio input devices in a telepresence environment are the source of noise and which are the source of human speech so that accommodations may be made to filter out the noise prior to audio communication. In addition, a need exists to control the listening levels of the audio input devices in response to determining which audio input sources are experiencing noise and which are the source of human speech. Further, in the event that a speaker in the telepresence environment has placed their audio input device in a mute state, a need to make a participant immediately aware, upon detection of human speech at their respective audio input device, that their device requires unmuting.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, computer-implemented methods, computer program products and the like that provide for intelligent noise cancellation for audio and/or video conference calls, such as, call conducted in a telepresence environment/room. Specifically, the present invention leverages different levels of deep learning model classifiers to determine, in real-time, whether an audio input device is experiencing noise data, voice data or a combination of both noise and voice data and, in response, appropriate action is taken to prevent the noise data from being included in the subsequent audio communication. In this regard, according to specific embodiments of the invention, a lightweight (i.e., simplistic) neural network-based model classifier is initially used to identify, for each audio input device, noise data and/or the presence of predetermined trigger words or phrases (i.e., words or phrases typically spoken during a conference call or the like). In the event that the lightweight model is unable to detect noise data or the presence of the triggering words/phrases, a heavyweight (i.e., more complex) neural network-based model classifier is called upon, whereby the audio signals are attempted to be converted to a human-understandable language format (i.e., a text format).

Based on the results of the model classifiers, an output controller determines whether each audio input device includes noise data only, voice data only or a combination of voice data and noise data. Signals from audio input devices having voice data only are allowed to pass to the audio transmission circuitry, while signals from audio inputs devices having only noise data are blocked from output transmission. In specific embodiments of the invention, in the event the signal contains both voice data and noise data, the voice data is allowed to pass to the transmission circuitry if the ratio of voice data is higher than the noise data and noise data is blocked if the ratio of the noise data is higher than the voice data.

In other specific embodiments of the invention, where applicable, the output controller is configured to adjust the listening ability of the audio input devices based on the data contained in signals coming from respective audio input devices. For example, audio input devices that are determined to be limited to voice signals may be increased in listening volume, while audio input devices that are determined to be limited to noise signals may be decreased in listening volume.

In additional embodiments of the invention, once a determination is made that a signal includes voice only data or, in some embodiments the voice data ratio is higher than the noise ratio, a check is made to ensure that the audio input device is not in a mute state. If the determination is made that the corresponding audio input device is in a mute state, an alert is generated and communicated to the user of the associated audio input device, notifying the user of the need to unmute the audio input device.

An apparatus for intelligent noise cancellation for audio and video conference calls defines first embodiments of the invention. The apparatus, which may comprise one or more devices includes a computing platform having a memory and at least one processing device stored in the memory. The apparatus additionally includes a plurality of audio input devices, including microphones, each audio input device configured to receive an audio input signal. Further, the apparatus includes a first neural network model classifier that is stored in the memory and executable by the processing device. The first neural network model classifier is a lightweight (i.e., simplistic) model that is configured to analyze information related to one or more of the audio input signals to identify noise data and a presence of one or more predetermined words or phrases in the audio input signal. For example, the predetermined words or phrases may be words or phrases commonly spoken in a conference call or the like. In addition, the apparatus includes a second neural network model classifier that is stored in the memory and executable by the processing device. The second neural network model classifier is a heavyweight (i.e., more complex) model that is configured to, in response to the first neural network model classifier failing to identify the presence of one or more of the predetermined words and phrases in at least one of the one or more audio input signals, attempt to convert the at least one of the audio input signals to human-comprehendible text format. Moreover, the apparatus includes an output controller that is stored in the memory, executable by the processor and configured to determine whether to pass or block each audio input signal based on results from the first and second neural network model classifiers, and an output device in communication with the output controller and configured to output, to a transmission means or the like, the input audio signals that are passed by the output controller.

In further specific embodiments of the apparatus, the output controller is further configured to (i) pass audio input signals that the results of models show only comprise voice data or have a higher ratio voice data than noise data, and (ii) block audio signals that the results of the models show only comprise noise data or have a higher ratio noise data than voice data.

In further specific embodiments of the apparatus, the output controller is further configured to (i) check for a mute state of each audio input device having an audio input signal that is determined to pass, and (ii) in response to determining that one or more of the audio input devices are in a muted state, generate and communicate an alert signal configured to notify a user that the audio input device requires unmuting. In specific embodiments of the apparatus, the alert signal includes a visual signal that is displayed on a display proximate to the audio input device, an audio signal that is wireless communicated to headphones or earphones worn by the user/speaker or both a visual and audio signal.

In still further specific embodiments of the apparatus, the output controller is further configured to generate and communicate (i) an increase volume signal to each audio input device having an audio input signal comprising only voice data, and (ii) a decrease volume signal to each audio input device having an audio input signal comprising only noise data. In this regard, the apparatus is capable of controlling the volume levels of the audio input devices/microphones in response to determining whether the audio input devices in currently receiving voice signals or noise signals.

In additional specific embodiments the apparatus further includes an activation controller that is stored in the memory, executable by the processing device, and in communication with each of the audio input devices. The activation controller is configured to (i) receive an audio input signal in analog format from each of the audio input devices, (ii) convert the audio input signal to digital format, (ii) calculate the decibel value for each of the audio input signals, and (iv) block audio input signals from processing by the first and second neural network model classifier in response to determining that the decibel value for a corresponding audio input signal is less than a predetermined decibel threshold value. In this regard, a received audio signal must be meet a prescribed decibel level before the signal is passed to the neural network model classifiers for further analysis. Further, in related embodiments the apparatus includes a spectrogram converter that is stored in the memory, executable by the processing device, and in communication with the activation controller and the first neural network model classifier. The spectrogram converter is configured to (i) receive, from the activation controller, audio input signals having a decibel value greater than the predetermined decibel threshold value, and (ii) convert the audio input signal from the digital format to a spectrogram that comprises a visual representation of a spectrum of frequencies of the audio input signal as the audio input signal varies over time.

A computer-implemented method for intelligent noise cancellation for audio and video conference calls defines second embodiments of the invention. The method is executed by one or more processing devices. The method includes receiving a plurality of audio input signals, each audio input signal being received form a corresponding one of a plurality of audio input devices. In addition, the method includes analyzing, by a first neural network model classifier, information related to one or more of the audio input signals to identify noise data and a presence of one or more predetermined words or phrases in the audio input signal. Additionally, the method includes, in response to the first neural network model classifier failing to identify the presence of one or more of the predetermined words and phrases in at least one of the one or more audio input signals, attempting to convert, by a second neural network model classifier, the at least one of the audio input signals to human-comprehendible text format. Moreover, the method includes determining whether to pass or block each audio input signal based on results from the first and second neural network model classifiers, and outputting the input audio signals that are determined to be passed.

In specific embodiments of the computer-implemented method, determining further includes determining to (i) pass audio input signals that comprise only voice data or have a higher ratio voice data than noise data, and (ii) block audio signals that comprise only noise data or have a higher ratio noise data than voice data.

In other specific embodiments the computer-implemented method includes checking for a mute state of each audio input device having an audio input signal that is determined to pass, and, in response to determining that one or more of the audio input devices are in a muted state, generating and communicating an alert signal configured to notify a user that the audio input device requires unmuting. In further specific embodiments of the method, the alert signal that is generated is communicated may be an visual signal, an audio signal and/or a combined visual/audio signal.

In additional embodiments the computer-implemented method includes generating and communicating (i) an increase volume signal to each audio input device having an audio input signal comprising only voice data, and (ii) a decrease volume signal to each audio input device having an audio input signal comprising only noise data.

Moreover, in additional embodiments the computer-implemented method includes (i) receiving an audio input signal in analog format from each of the audio input devices, (ii) converting the audio input signal from analog format to digital format, (iii) calculating the decibel value for each of the audio input signals, and (iv) blocking audio input signals from processing by the first and second neural network model classifier in response to determining that the decibel value for a corresponding audio input signal is less than a predetermined decibel threshold value. In related embodiments the computer-implemented method includes receiving audio input signals having a decibel value greater than the predetermined decibel threshold value and converting the audio input signal from the digital format to a spectrogram that comprises a visual representation of a spectrum of frequencies of the audio input signal as the audio input signal varies over time.

In specific embodiments of the computer program product, the fourth set of codes are further configured to cause the computer processor to determine to (i) pass audio input signals that comprise only voice data or have a higher ratio voice data than noise data, and (ii) block audio signals that comprise only noise data or have a higher ratio noise data than voice data.

In other specific embodiments of the computer program product, the computer-readable medium further includes a sixth set of codes for causing a computer processor to (i) check for a mute state of each audio input device having an audio input signal that is determined to pass, and (ii) in response to determining that one or more of the audio input devices are in a muted state, generate and communicate an alert signal configured to notify a user that the audio input device requires unmuting.

In still further specific embodiments of the computer program product, the computer-readable medium further includes a sixth set of codes for causing a computer processor to generate and communicate (i) an increase volume signal to each audio input device having an audio input signal comprising only voice data, and (ii) a decrease volume signal to each audio input device having an audio input signal comprising only noise data.

In additional specific embodiments of the computer program product, the computer-readable medium further includes a sixth set of codes for causing a computer processor to (i) receive an audio input signal in analog format from each of the audio input devices, (ii) convert the audio input signal from analog format to digital format, (iii) calculate the decibel value for each of the audio input signals, and (iv) block audio input signals from processing by the first and second neural network model classifier in response to determining that the decibel value for a corresponding audio input signal is less than a predetermined decibel threshold value. In such embodiments of the computer program product, the computer-readable medium may further include a seventh set of codes for causing a computer processor to (i) receive audio input signals having a decibel value greater than the predetermined decibel threshold value, and (ii) convert the audio input signal from the digital format to a spectrogram that comprises a visual representation of a spectrum of frequencies of the audio input signal as the audio input signal varies over time.

Thus, systems, apparatus, methods, and computer program products herein described in detail below provide for intelligent noise cancellation for audio and/or video conference calls, specifically, in some embodiments, calls conducted in a telepresence environment/room. Different levels of deep learning model classifiers are leveraged to determine, in real-time, the presence of noise data and voice data in audio input signals being received at numerous audio input devices. In response, appropriate action is taken to prevent the noise data from being included in the subsequent audio communication. Specifically, a lightweight neural network-based model classifier is initially used to identify input device, noise data and/or the presence of predetermined trigger words or phrases in audio input signals. In the event that the lightweight model is unable to identify the presence of the triggering words/phrases, a heavyweight neural network-based model classifier is called upon, whereby the audio signals are attempted to be converted to a human-understandable language format (i.e., a text format) to positively identify voice data in an audio input signal.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
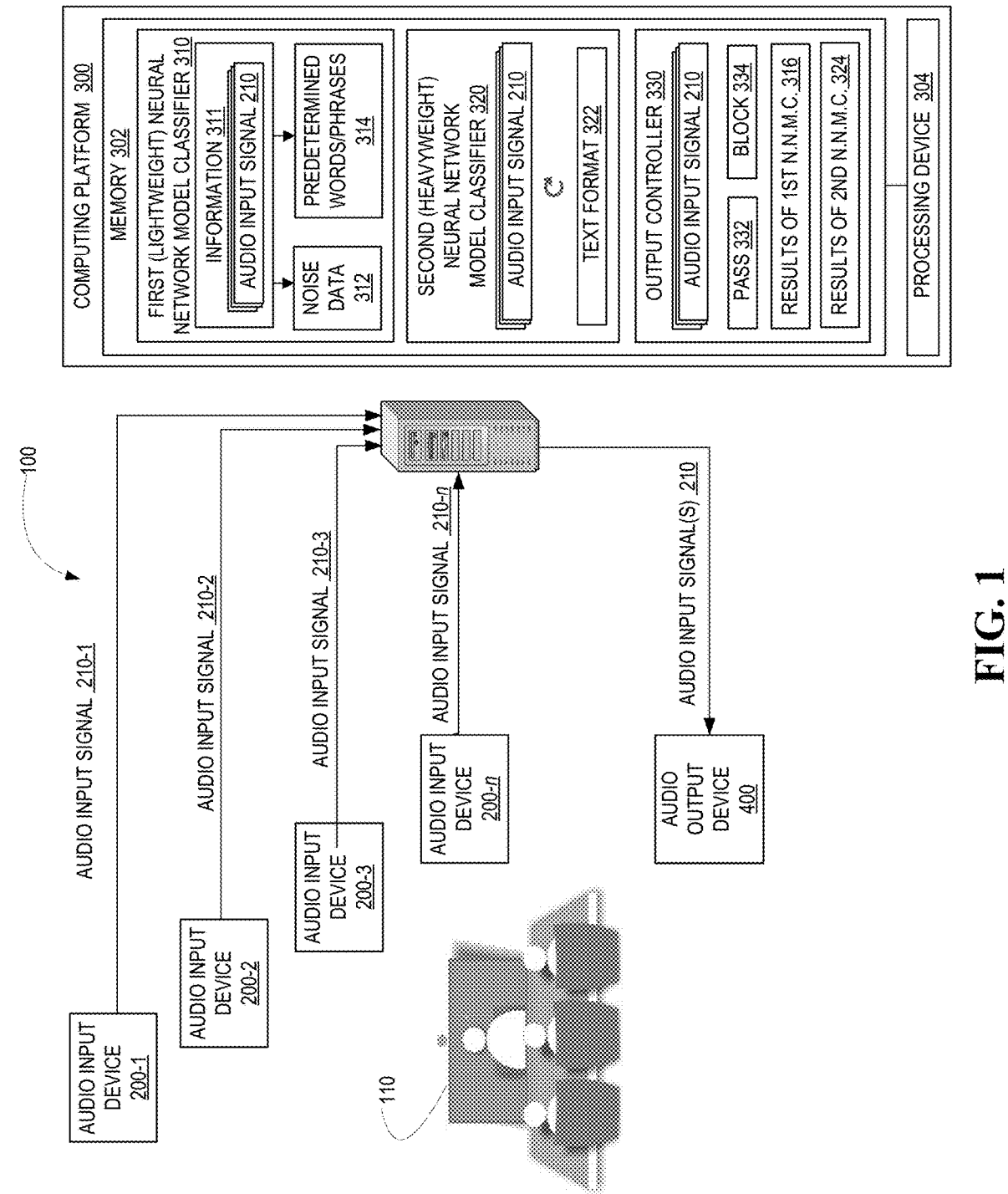
Figure 2:
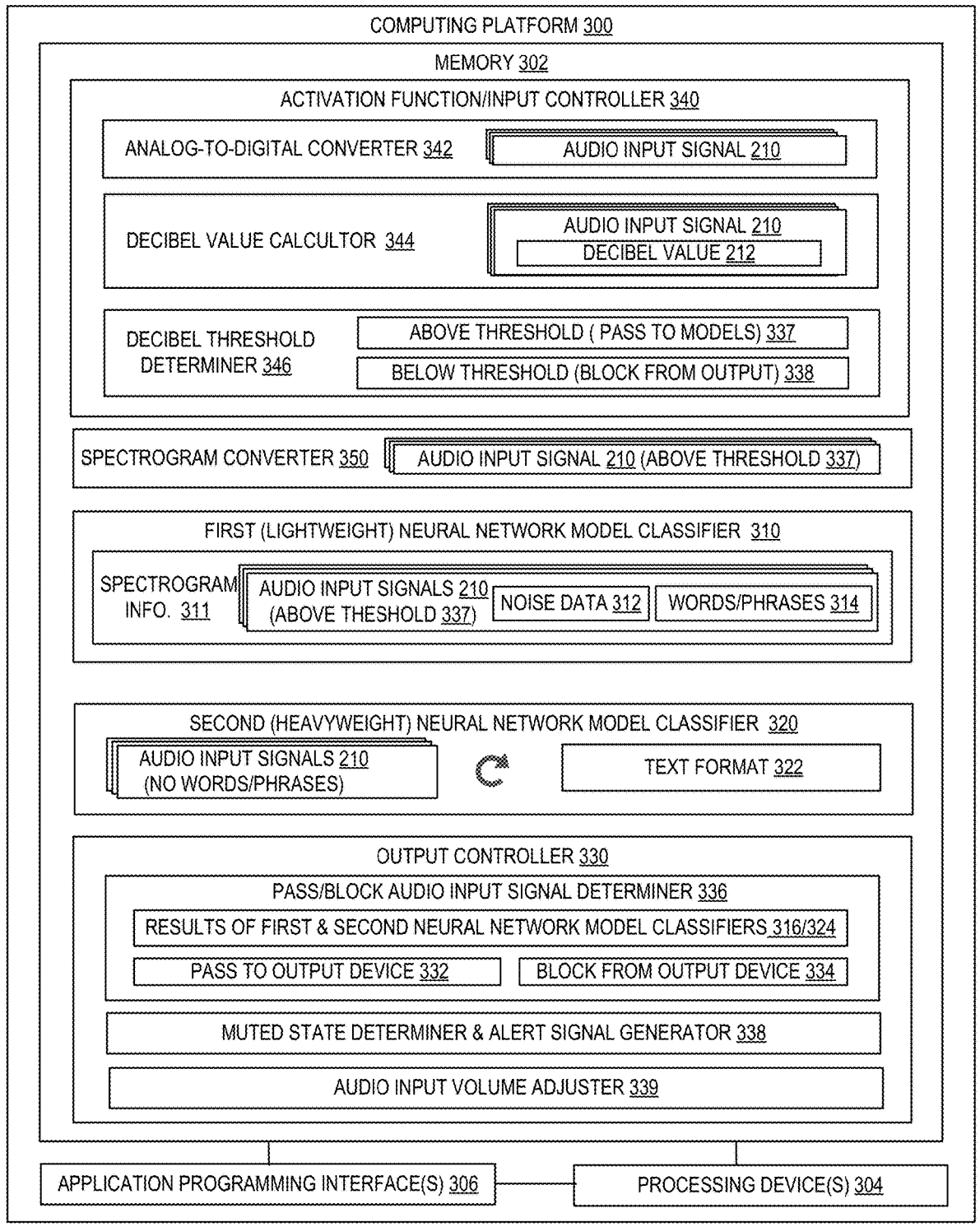
Figure 3:
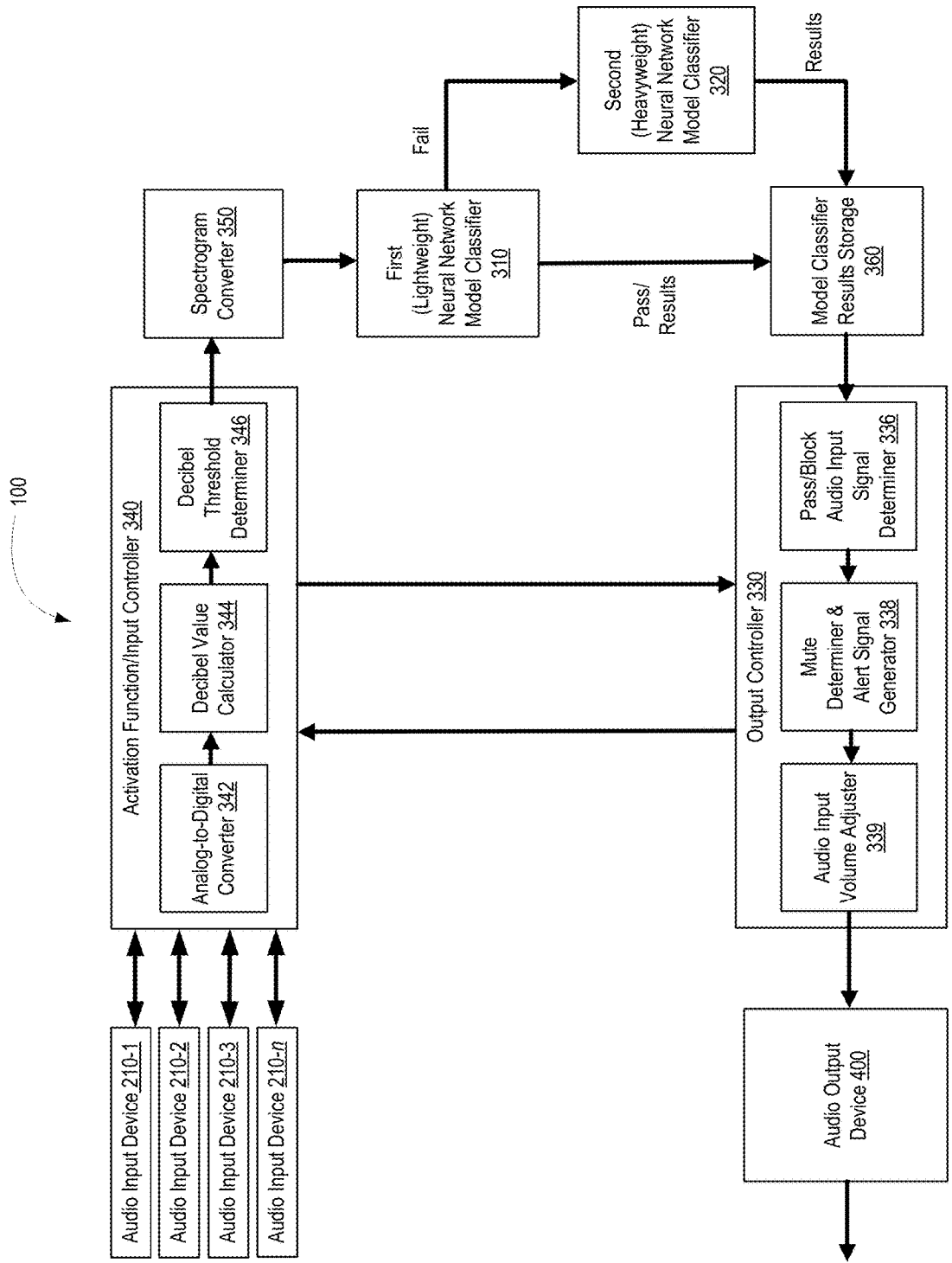
Figure 4:
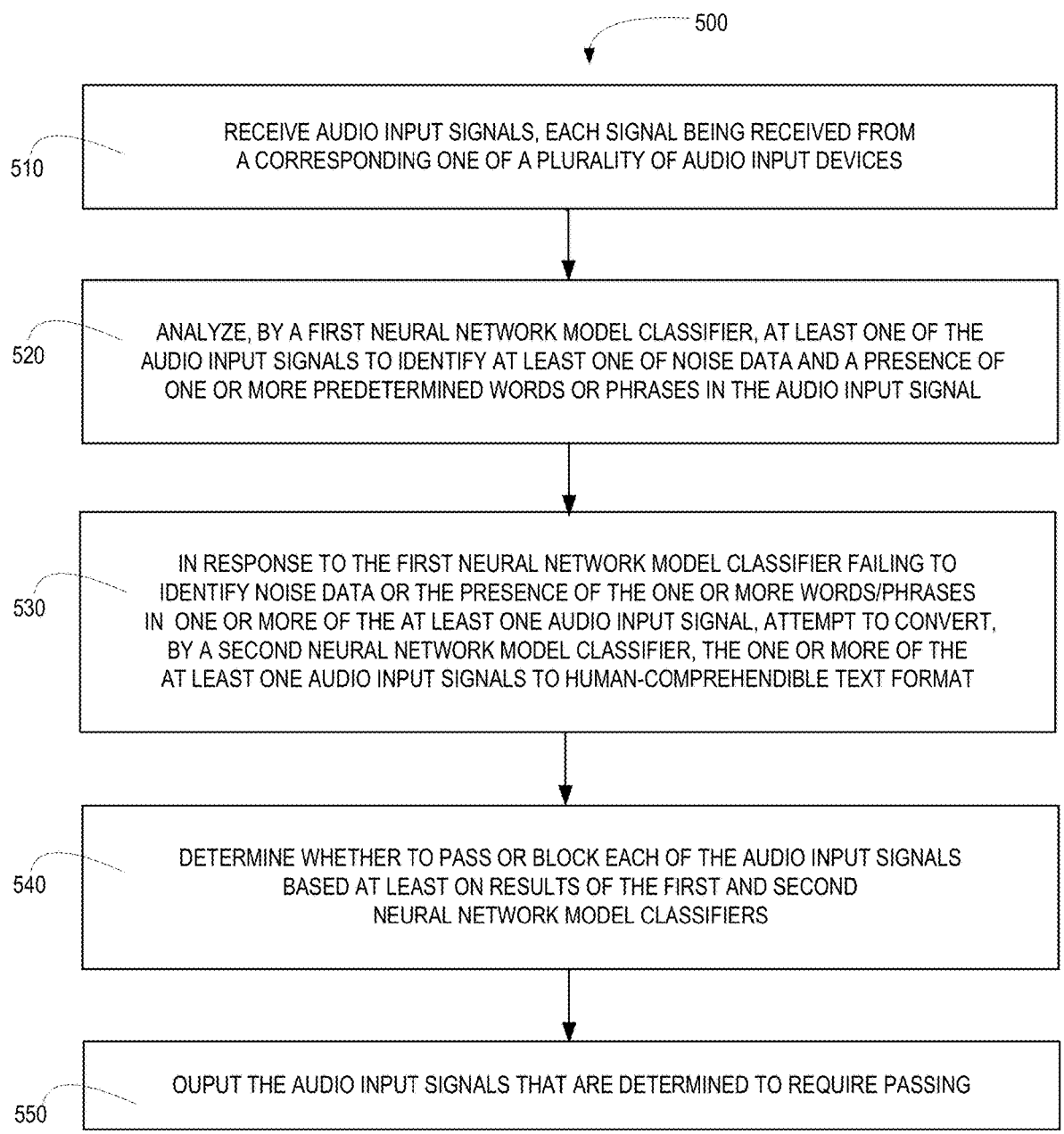

Having thus described embodiments of the invention in general terms, reference will now be made the accompanying drawings, wherein:

FIG. 1 is a schematic/block diagram of an apparatus for intelligent noise cancellation for audio and/or video conference calls, in accordance with embodiments of the present disclosure;

FIG. 2 is a block diagram of computing platform configured for intelligent noise cancellation for audio and/or video conference calls, in accordance with embodiments of the present invention;

FIG. 3 is a schematic/flow diagram of an apparatus and method for intelligent noise cancellation for audio and/or video conference calls, in accordance with embodiments of the present invention; and FIG. 4 is a flow diagram of method for intelligent noise cancellation for audio/video conference calls, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for intelligent noise cancellation for audio and/or video conference calls, for example conference calls conducted in a telepresence environment/room in which audio is received from multiple audio input devices (i.e., microphones). Specifically, the present invention leverages different levels of deep learning model classifiers to determine, in real-time, whether an audio input device is currently experiencing noise data, voice data or a combination of both noise and voice data and, in response, appropriate action is taken to prevent the noise data from being included in the subsequent audio communication. According to specific embodiments of the invention, a lightweight (i.e., simplistic) neural network-based model classifier is initially used to identify noise data and/or the presence of predetermined trigger words or phrases (i.e., words or phrases typically spoken during a conference call or the like). In the event that the lightweight model is unable to detect noise data or the presence of the triggering words/phrases, a heavyweight (i.e., more complex) neural network-based model classifier is called upon, whereby the audio signals are attempted to be converted to a human-understandable language format (i.e., a text format).

Based on the results of the model classifiers, an output controller determines whether each audio input device includes noise data only, voice data only or a combination of voice data and noise data. Signals from audio input devices having voice data only are allowed to pass to the audio transmission circuitry, while signals from audio inputs devices having only noise data are blocked from output transmission. In specific embodiments of the invention, in the event the signal contains both voice data and noise data, the voice data is allowed to pass to the transmission circuitry if the ratio of voice data is higher than the noise data and, conversely, noise data is blocked if the ratio of the noise data is higher than the voice data.

In other specific embodiments of the invention, where applicable, the output controller is configured to adjust the listening ability of the audio input devices based on the data contained in signals coming from respective audio input devices. For example, audio input devices that are determined to be limited to voice signals may be increased in listening volume, while audio input devices that are determined to be limited to noise signals may be decreased in listening volume.

In additional embodiments of the invention, once a determination is made that a signal includes voice only data or, in some embodiments the voice data ratio is higher than the noise ratio, a check is made to ensure that the audio input device is not in a mute state. If the determination is made that the corresponding audio input device is in a mute state, an alert is generated and communicated to the user of the associated audio input device, notifying the user of the need to unmute the audio input device.

Turning now to the figures, FIG. 1 illustrates an apparatus 100 configured for intelligent noise cancellation, in accordance with one embodiment of the present invention. The apparatus 100, which may comprise one or more devices, includes a plurality of audio input devices 200-1, 200-2, 200-3, 200-n, which include a microphone or the like configured for receiving audio input signals 210-1, 210-2, 210-3, 210-n. In specific embodiments of the invention, the audio input devices 200-1, 200-2, 200-3, 200-n are strategically disposed throughout various locations within a conference room 110, such as a telepresence room/environment particularly configured for audio and/or video conference calls. In other specific embodiments of the invention, the audio input devices 200-1, 200-2, 200-3, 200-n may be included within in a single unit conference call telephone or the like.

The apparatus 100 additionally includes a computing platform 300 having a memory and at least one processing device 304 in communication with the memory 302. The memory 302 of computing platform 300 stores first (lightweight) neural network model classifier 310 that is configured to receive information 311 related to one or more of the audio input signals 210 to identify those audio input signals 210 that include noise data 312 and/or predetermined words/ phrases 314. In this regard, the first lightweight neural network model classifier 310 is trained on a sequential Convolutional Neural Network (CNN) to check for noise data 312 and the presence of the predetermined words/phrases 314. In specific embodiments of the invention, the predetermined words and/or phrases 314 are words and/or phrases associated with a conference call (e.g., "welcome", "hello team", "let's begin the meeting" or the like).

The memory 302 of computing platform 300 additionally stores second (heavyweight) neural network model classifier 320 that is invoked in response to the first neural network model classifier 310 failing to identify noise data 312 or one or more of the predetermined words and/or phrases 314 in at least one of the one or more of the audio input signals 210. The second neural network model classifier 310, which is trained on a high density sequential CNN with conventional is voice data, is configured to attempt to convert voice data in an input signal into human comprehendible language/text format 322. The purpose of the conversion is to verify the presence of voice data in the corresponding audio input signal.

The memory 302 of computing platform 300 additionally includes output controller 330 that is configured to receive results 316 from first neural network model classifier 310 and, in some instances, results 324 from second neural network model classifier 320 and determine whether to pass 332 or block 334 each of the audio input signals 210 based at least on the results 316, 324 from first and second neural network model classifiers 310, 320.

The apparatus additionally includes an audio output device 400 that is configured to receive passed 332 audio inputs signals 210 and output the signals 210 for subsequent transmission to the external parties (not shown in FIG. 1) participating in the conference call.

By implementing both highly customizable lightweight and heavyweight deep learning model classifiers (i.e., first and second neural network model classifiers 310 and 320) the present invention is able to provide optimal results in real-time. This is because the second neural network model classifier 320 is only invoked in limited instances in which the first neural network model classifier 310 is unable to detect the presence of voice data based on the predetermined words or phrases (i.e., triggering words or phrases).

Referring to FIG. 2, a block diagram is shown of a computing platform 300 for intelligent noise cancellation of audio/video conference calls, in accordance with various embodiments of the present invention. In addition to providing greater detail, FIG. 2 highlights various alternative embodiments of the invention. The computing platform 300 may comprise one or more computing devices (e.g., microphones, conference call telephones or the like) and is configured to execute engines, including models, algorithms, modules, routines, applications and the like. Computing platform 300 includes memory 302 which may comprise volatile and non-volatile memory, such as read-only and/or random-access memory (RAM and ROM), EPROM, EEPROM, flash cards, or any memory common to computing platforms). Moreover, memory 302 and the like may comprise cloud storage, such as provided by a cloud storage service and/or a cloud connection service.

Further, computing platform 300 also includes at least one processing device 304, or the like which may be an application-specific integrated circuit ("ASIC"), or other chipset, logic circuit, or other data processing device configured to implement artificial intelligence including machine learning techniques. Processing device(s) 304 or the like may execute one or more application programming interface (APIs) 306 that interface with any resident programs, such as first and second neural network model classifiers 310, 320, input controller 340 and output controller 330 or the like stored in the memory 302 of the computing platform 300 and any external programs. Processing device(s) 304 may include various processing subsystems (not shown in FIG. 2) embodied in hardware, firmware, software, and combinations thereof, that enable the functionality of the computing platform 300 and the operability of the computing platform 300 on a communications network (not shown in FIG. 2). For example, processing subsystems allow for initiating and maintaining communications and exchanging data with other networked devices. For the disclosed aspects, processing subsystems of computing platform 300 may include any processing subsystem used in conjunction with first and second neural network model classifiers 310, 320, input controller 340 and output controller 330 and related engines, tools, routines, sub-routines, algorithms, sub-algorithms, sub-modules thereof.

Computing platform 300 may additionally include a communications module (not shown in FIG. 2) embodied in hardware, firmware, software, and combinations thereof, that enables electronic communications between the computing platform 300 and other network devices. Thus, communication module may include the requisite hardware, firmware, software and/or combinations thereof for establishing and maintaining a network communication connection with one or more network devices.

In specific embodiments of the invention, memory 302 of computing platform 300 stores activation function/input controller 340 that is configure to receive and process the audio input signals 210 coming from audio input devices 200-1, 200-2, 200-3, 200-n. Specifically, activation function/input controller 340 includes analog-to-digital converter 342 that is configured to convert the analog audio input signals 210 to digital audio input signals 210. Further, activation function/input controller 340 includes decibel value calculator 344 that is configured to calculate a decibel value 212 for each of the plurality of audio input signals 210.

Additionally, activation function/input controller 340 includes decibel threshold determiner 346 that is configured to determine which audio input signals 210 are above 337 a predetermined decibel value threshold and which audio input signals 210 are below 338 the predetermined decibel value threshold. In response to determining that one or more of audio input signals 210 are above 337 the predetermined decibel value threshold, the audio signals are passed to the neural network model classifiers 310, 320 for further analysis as to the contents of the audio signal. In response to determining that one or more of the audio input signals are below 338 the predetermined decibel value threshold, the corresponding input signals are blocked from being outputted (e.g., a block signal is communicated to the output controller 330). As a result, only those signals which reach a predetermined level of decibels (i.e., loudness) are further processed by the neural network model classifiers to determine whether they contain noise data and/or voice data. In specific embodiments of the invention, the predetermined decibel threshold is set at about 50 dB (decibels). Such a decibel threshold takes into account that normal voice conversion occurs at about 60 dB, while a quiet conversation occurs at about 40 dB. As such, when the predetermined decibel threshold is set at 50 dB quiet conversations, such as background conversations amongst two or more conference call participants, are blocked from being outputted.

Memory 302 of computing platform 300 additionally includes spectrogram converter 350 that is configured to convert the digital audio input signals 210, which are above 337 the predetermined decibel threshold, to a spectrogram. A spectrogram provides a visual representation of the spectrum of frequencies of a signal as it varies with time and the spectrogram information 311 is subsequently used by the first neural network model classifier 310.

As previously discussed in relation to FIG. 1, the memory 302 of computing platform 300 stores first neural network model classifier 310 that is configured to receive the spectrogram information 311 and identify those audio inputs signals 210, which are above 337 the decibel value threshold, that include noise data 312 and/or predetermined words and/or phrases 314. The first neural network model classifier is trained on sequential CNN with noise data and the set of predetermined words and/or phrases. Specifically, first neural network model classifier 310 extracts features from spectrogram images, such as pixel values and converts it to a flat array for purposes of training the model to identify noise data 312 and the predetermined words and phrases 314. Once the model has been properly trained, the model is implemented to identify audio input signals 210 that include noise data 312 and/or one or more of the predetermined words/phrases 314.

Further, memory 302 of computing platform 300 stores second neural network model classifier 320 that is invoked in response to the first neural network model classifier failing to identify noise data 312 or one or more of the predetermined words/phrases 314 in one or more of the audio input signals 210. Once invoked, second neural network model classifier, which is trained on high density sequential CNN with conventional voice data, is configured to attempt to convert voice data into human comprehendible text format data 322 for purposes of confirming that the audio input signal 210 includes voice data. In the event, the second neural network model classifier is unable to convert data in the audio input signal to text format 322, the audio input signal 210 is deemed to contain noise data 312 only.

Memory 302 of computing platform 300 additionally includes output controller 330 which includes pass/block signal determiner 336 that is configured to determine, based on at least on first results 316 from the first neural network model classifier 310 and second results 324 from the second neural network model classifier 320, whether an audio input signal 210 is to be passed 332 to the output device 400 (not shown in FIG. 2) or blocked 334 from proceeding to the output device 400. As previously noted, in specific embodiments of the invention, the determination on whether to pass 332 or block 334 audio input signals is further based on results from the decibel threshold determiner 346 (i.e., audio input signals 210 having a decibel threshold below 338 the predetermined threshold are blocked without having to undergo further processing by the neural network model classifiers).

In specific embodiments of the invention, In specific embodiments of the invention, pass/block signal determiner 336 is configured to block 334 any audio input signal 210 that is determined to contain only noise data 312 and to pass 332 any audio input signal that is determined to contain only voice data. Moreover, in further specific embodiments of the invention, pass/block signal determiner 336 is configured to pass 332 those audio input signals having both noise data 312 and voice data that are determined to have a higher ratio of voice data than noise data and block 332 those audio input signals that are determined to have a higher ratio of noise data than voice data.

In other specific embodiments of the invention, output controller 330 includes muted state determiner and alert signal generator 338 that is configured to, in response to determining that an audio input signal is to be passed to the output device 400, determine whether the audio input device/microphone 200 is in a muted state. In response to determining that one or more of the audio input devices/microphones 200 are in a muted state, the alert signal generator 338 generates and initiates communication of an alert that is configured to notify the participant/speaker that their respective audio input device/microphone 200 is in a muted state and requires change from the muted state to the unmuted state in order for the audio input signal to be outputted by the out device 400. In specific embodiments of the invention, the alert signal may be a visual signal, such as text message displayed to the participant/speaker on a display that is proximate to the audio input device 200 or a flashing light displayed on the display. In other specific embodiments of the invention, the alert may be an audio signal that is communicated to a headset, ear-pod or other audio-receiving device worn by the participant/speaker via a short-range wireless protocol. In such embodiments of the invention, the audio signal may be preconfigured noise, such as chime or the like, or a prerecorded message notifying the participant/speaker that the microphone is in a muted state and requires change to an unmuted state.

In still further specific embodiments of the invention, output controller 330 includes audio input device volume adjuster 339 that is configured to adjust the listening volume of one or more of the audio input devices 200 based at least on the results of the pass/fail audio input signal determiner 336. For example, in specific embodiments of the invention, if an audio input signal 210 is determined to contain only noise data the corresponding audio input device/microphone 200 is adjusted for a lower listening volume and if the audio input signal 220 is determined to contain only voice data the corresponding audio input device/microphone 200 is adjusted for a higher listening volume. In specific embodiments of the invention, if the audio input signal is determined to include both noise data and voice data, no adjustment to the corresponding audio input device 200 is undertaken. While in other specific embodiments of the invention, if the audio input signal is determined to include both noise data and voice data, the ratio of voice data to noise data must exceed a predetermined threshold for the corresponding audio input device/microphone to be adjusted for higher listening volume or the ratio of noise data to voice data must exceed a predetermined threshold for the corresponding audio input device/microphone to be adjusted for lower listening volume.

Referring to FIG. 3 a detailed composite block/flow diagram is depicted of an apparatus 100 configured for intelligent noise cancellation during audio/video conference calls, in accordance with embodiments of the present invention. Audio input devices 210-1, 210-2, 210-3, 210-n receive corresponding audio input signals, which are communicated to an activation function/input controller 340. Activation function/input controller 340 includes analog-to-digital converter 342 that is configured to convert the analog audio input signals to a digital format. Once converted to the digital format, decibel value calculator 344 is configured to calculate a decibel value for each of the audio input signals. In response to calculating the decibel value, decibel threshold determiner 346 is configured to determine whether each of the decibel values meet or exceed a predetermined decibel value threshold. Audio input signals having decibel values that meet or exceed the predetermined threshold are further processed by the model classifiers to determine whether the include noise data and/or voice data, while audio input signals having decibel values that fail to meet/fall below the predetermined threshold are blocked from being outputted by audio output device 400 (i.e., a signal is communicated from the decibel threshold determiner 346 to the pass/block signal determiner 336 of the output controller 330). As previously discussed, the predetermined decibel threshold may be set at a decibel level so as to block the output of audio input signals associated with background conversations (e.g., conversations not meant for transmission to the other parties participating in the conference call).

Those audio input signals having decibel values that meet or exceed the predetermined decibel value threshold are communicated to the spectrogram converter 350, which is configured to convert the digitized audio signals to a spectrogram, which provides a visual representation of the spectrum of frequencies of a signal as it varies with time.

The spectrogram information serves as the input for first (lightweight) neural network model classifier 310, which has been trained, over time by sequential CNN, to identify those audio input signals that include noise and/or predetermined words/phrases. As previously, discussed the predetermined words or phrases are a set of words or phrases commonly associated with a conference call. In the event, first neural network model classifier 310 identifies noise data and/or one or more predetermined words/phrases in the audio input signal, the results are temporarily stored in model classifier results storage 360 before subsequently passing the results to the output controller.

In the event that the first neural network model classifier is unable to determine that an audio input signal includes noise and/or one or more of the predetermined words and/or phrases, second (heavyweight) neural network model classifier 320 is invoked. Second neural network model classifier 320 is configured to attempt to convert the data in the audio input signals to human comprehendible text format data. If the data in the audio input signal is unable to be converted to text format, the data is deemed to be noise data. Since the computations in the second neural network model classifier are more processing-intensive and may result in a degree of latency, the use of the second neural network model classifier is limited to only those instances in which the first neural network model classifier is unable to identify noise and/or the predetermined words so as to insure that the overall noise detection process can occur in real-time or in near real time. The use of two separate neural network model classifiers allows for each model classifier to understand their respective data and functions better than if a solitary combined model were to be implemented and performs inefficiently to allow for real-time or near real-time processing of audio input signals.

The output controller 330 receives the results from the decibel threshold determiner 346, first neural network model classifier 310 and second neural network model classifier 320. The output controller includes pass/block signal determiner 336 that is configured to determine, based on the results from decibel threshold determiner 346, first neural network model classifier 310 and second neural network model classifier 320, whether audio input signals are passed to the audio output device 400 for subsequent transmission or are blocked from further output/transmission. In specific embodiments of the invention, pass/block signal determiner 336 is configured to pass audio input signals that include only voice data or have a ratio of voice data higher than noise data. In such specific embodiments of the invention, pass/block signal determiner 336 is further configured to block audio inputs signals that are below the predetermined decibel value or include only noise data or have a ratio of noise data higher than voice data.

In other specific embodiments of the invention output controller 330 includes mute determiner and alert signal generator 336 that is configured to, in response to determining the audio input signals are to be passed to audio output device 400, determine whether the corresponding audio input device 210 is currently in a mute state (i.e., a state in which the signals are prohibited from being outputted/transmitted). In the event that the mute determiner 336, determines that one or more of the corresponding audio input devices 210 are in a mute state, alert signal generator 336 is configured to generate an initiate communication of an alert that notifies the participant/speaker of the mute state and requests that the participant/speaker move the microphone from the mute state to the unmuted state. As previously noted, the alert may be in the form of an visual alert, and audio alert and a combination audio/visual alert.

Further, in other specific embodiments, output controller 330 includes audio input device volume adjuster 339 that is configured to adjust the listening volume of an audio input device in response to the results of the pass/block audio input signal determiner 336. In specific embodiments of the invention, audio input signals that contain only voice data and are passed to the audio output device provide for the adjuster 339 to signal the corresponding audio input device(s) 210 for an increase in listening volume and audio input signals that contain only noise data and are blocked from output/transmission provide for the adjuster 339 to signal the corresponding audio input device(s) for a decrease in listening volume.

Referring to FIG. 4, a flow diagram is depicted of a method 500 for noise cancellation of audio input signals being received from an audio/video conference call environment, in accordance with embodiments of the present invention.

At Event 510, a plurality of audio input signals are received, each signal being received from a corresponding one of a plurality of audio input devices. In specific embodiments of the method, each of the received audio input signals are converted to a digital format, a decibel level is calculated and the decibel level is compared to a decibel value threshold to determine whether the audio input signal should be blocked (i.e., below the predetermined decibel/loudness threshold) or requires further processing by the model classifiers to determine whether the signal includes voice data and/or noise data.

At Event 520, at least one of the audio input signals is analyzed by a lightweight neural network model classifier which is trained to identify noise data and the presence of predetermined words/phrases in the audio input signal.

In the event that the lightweight neural network model classifier is unable to identify noise data and/or the presence of the predetermined words/phrases in one or more of the at least one audio input signals, at Event 530, a heavyweight neural network model classifier is invoked to attempt to convert the data in the signal to text format (i.e. human-readable/comprehendible format). Conversion of the data to the text format verifies the presence of voice data, while failure to convert the data to text format implies that the data is noise data.

At Event 540, a determination is made as to whether each of the audio input signals should be passed to the audio output device for subsequent transmission or blocked from the audio output device based at least on the results of the lightweight and heavyweight neural network model classifiers and, in some embodiments, the results of the decibel value threshold comparison. In specific embodiments of the invention, the audio input signals are allowed to be passed to the audio output device if the signal contains only voice data or the ratio of voice data is higher than noise data and the audio signals are blocked from being outputted if the signal contains only noise data or the ratio of noise data is higher than voice data.

In further embodiments of the method, for those audio input signals that are allowed to pass to the output, a check is made as to whether the corresponding audio input device is in a muted state. If it is determined that the corresponding audio input device is muted, then an alert is generated and communicated to the participant/speaker notifying the same that the audio input device is in a muted state and requires change to the unmuted state. In still further embodiments of the invention, the contents of an audio input signal will dictate change in the listening level of corresponding audio input devices/microphones. For example, an audio input signal that contains only noise data may provide for the corresponding audio input device/microphone to be decreased in listening volume, while an audio input signal that contains only voice data may provide for the corresponding audio input device/microphone to be increased in listening volume.

At Event 550, the audio input signals that have been passed to the audio output device are outputted for subsequent transmission to other parties participating in the audio/video conference call. It should be noted that more than one audio input signal may be transmitted, if more than one audio input signal is determined to include only voice data above the requisite decibel level threshold or a ratio of voice data higher than noise data and above the requisite decibel level threshold.

The invention claimed is:

1. An apparatus for intelligent noise cancellation for audio and video conference calls, the system comprising:
    a computing platform including a memory and at least one processing device stored in the memory;
    a plurality of audio input devices, each audio input device configured to receive an audio input signal;
    a first neural network model classifier stored in the memory, executable by the processing device and configured to analyze information related to one or more of the audio input signals to identify noise data and a presence of one or more predetermined words or phrases in the one or more of the audio input signals;
    a second neural network model classifier stored in the memory, executable by the processing device and configured to, in response to the first neural network model classifier failing to identify the presence of one or more of the predetermined words and phrases in at least one of the one or more audio input signals, attempt to convert the at least one of the audio input signals to human-comprehendible text format;
    an output controller stored in the memory, executable by the processor and configured to determine whether to pass or block each audio input signal based on results from the first and second neural network model classifiers; and
    an output device in communication with the output controller and configured to output the input audio signals that are passed by the output controller.

2. The apparatus of claim 1, wherein the output controller is further configured to (i) pass audio input signals that comprise only voice data or have a higher ratio voice data than noise data, and (ii) block audio signals that comprise only noise data or have a higher ratio noise data than voice data.

3. The apparatus of claim 1, wherein the output controller is further configured to (i) check for a mute state of each audio input device having an audio input signal that is determined to pass, and (ii) in response to determining that one or more of the audio input devices are in a muted state, generate and communicate an alert signal configured to notify a user that the audio input device requires unmuting.

4. The apparatus of claim 3, wherein the alert signal further comprises a visual signal that is displayed on a display proximate to the audio input device.

5. The apparatus of claim 3, wherein the alert signal further comprises an audio signal that is wireless communicated to headphones or earphones worn by the user.

6. The apparatus of claim 1, wherein the output controller is further configured to generate and communicate (i) an increase volume signal to each audio input device having an audio input signal comprising only voice data, and (ii) a decrease volume signal to each audio input device having an audio input signal comprising only noise data.

7. The apparatus of claim 1, further comprising an activation controller stored in the memory, executable by the processing device, in communication with each of the audio input device, and configured to (i) receive an audio input signal in analog format from each of the audio input devices, (ii) convert the audio input signal to digital format, (ii) calculate the decibel value for each of the audio input signals, and (iv) block audio input signals from processing by the first and second neural network model classifier in response to determining that the decibel value for a corresponding audio input signal is less than a predetermined decibel threshold value.

8. The apparatus of claim 7, further comprising a spectrogram converter stored in the memory, executable by the processing device, in communication with the activation controller and the first neural network model classifier and configured to (i) receive, from the activation controller, audio input signals having a decibel value greater than the predetermined decibel threshold value, and (ii) convert the audio input signal from the digital format to a spectrogram that comprises a visual representation of a spectrum of frequencies of the audio input signal as the audio input signal varies over time.

9. A computer-implemented method for intelligent noise cancellation for audio and video conference calls, the method executed by one or more processing devices and comprising:
    receiving a plurality of audio input signals, each audio input signal being received form a corresponding one of a plurality of audio input devices;
    analyzing, by a first neural network model classifier, information related to one or more of the audio input signals to identify noise data and a presence of one or more predetermined words or phrases in the one or more of the audio input signals;
    in response to the first neural network model classifier failing to identify the presence of one or more of the predetermined words and phrases in at least one of the one or more of the audio input signals, attempting to convert, by a second neural network model classifier, the at least one of the audio input signals to human-comprehendible text format;
    determining whether to pass or block each audio input signal based on results from the first and second neural network model classifiers; and outputting the input audio signals that are determined to be passed.

10. The computer-implemented method of claim 9, wherein determining further comprises determining to (i) pass audio input signals that comprise only voice data or have a higher ratio voice data than noise data, and (ii) block audio signals that comprise only noise data or have a higher ratio noise data than voice data.

11. The computer-implemented method of claim 9, further comprising:
   checking for a mute state of each audio input device having an audio input signal that is determined to pass; and
   in response to determining that one or more of the audio input devices are in a muted state, generating and communicating an alert signal configured to notify a user that the audio input device requires unmuting.

12. The computer-implemented method of claim 9, further comprising:
   generating and communicating (i) an increase volume signal to each audio input device having an audio input signal comprising only voice data, and (ii) a decrease volume signal to each audio input device having an audio input signal comprising only noise data.

13. The computer-implemented method of claim 9, further comprising:
   receiving an audio input signal in analog format from each of the audio input devices;
   converting the audio input signal from analog format to digital format;
   calculating the decibel value for each of the audio input signals; and
   blocking audio input signals from processing by the first and second neural network model classifier in response to determining that the decibel value for a corresponding audio input signal is less than a predetermined decibel threshold value.

14. The computer-implemented method of claim 13, further comprising:
   receiving audio input signals having a decibel value greater than the predetermined decibel threshold value; and
   converting the audio input signal from the digital format to a spectrogram that comprises a visual representation of a spectrum of frequencies of the audio input signal as the audio input signal varies over time.

15. A computer program product including non-transitory computer-readable medium that comprises:
   a first set of codes configured to cause a computer processor to receive a plurality of audio input signal, each audio input signal being received form a corresponding one of a plurality of audio input devices;
   a second set of codes for causing a computer processor to analyze, by a first neural network model classifier, information related to one or more of the audio input signals to identify noise data and a presence of one or more predetermined words or phrases in the one or more of the audio input signals;
   a third set of codes for causing a computer processor to, in response to the first neural network model classifier failing to identify the presence of one or more of the predetermined words and phrases in at least one of the one or more of the audio input signals, attempt to convert, by a second neural network model classifier, the at least one of the audio input signals to human-comprehendible text format;
   a fourth set of codes for causing computer processor to determine whether to pass or block each audio input signal based on results from the first and second neural network model classifiers; and
   a fifth set of codes for causing a computer processing device to output the input audio signals that are determined to be passed.

16. The computer program product of claim 15, wherein the fourth set of codes are further configured to cause the computer processor to determine to (i) pass audio input signals that comprise only voice data or have a higher ratio voice data than noise data, and (ii) block audio signals that comprise only noise data or have a higher ratio noise data than voice data.

17. The computer program product of claim 15, wherein the computer-readable medium further comprises a sixth set of codes for causing a computer processor to (i) check for a mute state of each audio input device having an audio input signal that is determined to pass, and (ii) in response to determining that one or more of the audio input devices are in a muted state, generate and communicate an alert signal configured to notify a user that the audio input device requires unmuting.

18. The computer program product of claim 15, wherein the computer-readable medium further comprises a sixth set of codes for causing a computer processor to generate and communicate (i) an increase volume signal to each audio input device having an audio input signal comprising only voice data, and (ii) a decrease volume signal to each audio input device having an audio input signal comprising only noise data.

19. The computer program product of claim 18, wherein the computer-readable medium further comprises a sixth set of codes for causing a computer processor to (i) receive an audio input signal in analog format from each of the audio input devices, (ii) convert the audio input signal from analog format to digital format, (iii) calculate the decibel value for each of the audio input signals, and (iv) block audio input signals from processing by the first and second neural network model classifier in response to determining that the decibel value for a corresponding audio input signal is less than a predetermined decibel threshold value.

20. The computer program product of claim 19, wherein the computer-readable medium further comprises a seventh set of codes for causing a computer processor to (i) receive audio input signals having a decibel value greater than the predetermined decibel threshold value, and (ii) convert the audio input signal from the digital format to a spectrogram that comprises a visual representation of a spectrum of frequencies of the audio input signal as the audio input signal varies over time.

* * * * *